(12) United States Patent
Balasuriya (10) Patent No.: US 6,834,265 B2
(45) Date of Patent: Dec. 21, 2004

(54) METHOD AND APPARATUS FOR SELECTIVE SPEECH RECOGNITION

(75) Inventor: Senaka Balasuriya, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 196 days.

(21) Appl. No.: 10/319,746

(22) Filed: Dec. 13, 2002

(65) Prior Publication Data

US 2004/0117179 A1 Jun. 17, 2004

(51) Int. Cl.$^7$ ............................................. G10L 15/00
(52) U.S. Cl. ................................. 704/270.1; 704/231
(58) Field of Search ........................... 704/270, 270.1, 704/275, 231

(56) References Cited

U.S. PATENT DOCUMENTS

| | | |
|---|---|---|
| 2,292,781 A | 8/1942 | Urs et al. |
| 5,087,906 A | 2/1992 | Eaton et al. |
| 5,365,574 A | 11/1994 | Hunt et al. |
| 5,956,683 A | 9/1999 | Jacobs et al. |
| 6,006,183 A | 12/1999 | Lai et al. |
| 6,101,472 A * | 8/2000 | Giangarra et al. .......... 704/275 |
| 6,119,087 A | 9/2000 | Kuhn et al. |
| 6,122,613 A | 9/2000 | Baker |
| 6,125,345 A | 9/2000 | Modi et al. |
| 6,185,535 B1 | 2/2001 | Hedin et al. |
| 6,269,336 B1 * | 7/2001 | Ladd et al. .................. 704/270 |
| 6,377,922 B2 | 4/2002 | Brown et al. |
| 6,453,290 B1 * | 9/2002 | Jochumson ................. 704/231 |
| 2001/0036255 A1 | 11/2001 | Reformato et al. |
| 2002/0091518 A1 | 7/2002 | Baruch et al. |

OTHER PUBLICATIONS

Maes, Stephane H., "Multi–modal Web IBM Position," W3C/WAP Workshop, IBM Human Language Technologies, pp. 1–9.

* cited by examiner

Primary Examiner—David D. Knepper
(74) Attorney, Agent, or Firm—Vedder, Price, Kaufman & Kammholz (57) ABSTRACT

A method and apparatus for selective speech recognition includes receiving a media file (112) having a media type indicator (114). The method and apparatus further includes a browser (104) that receives the media file and a speech recognition engine selector (106) that receives the media type indicator from the browser (104). The selected speech recognition engine selector (106) then selects either a first speech recognition engine (108) or a second speech recognition engine (110), in response to the media type indicator. The method and apparatus further includes an audio receiver (102) that receives an audio input (116) which is provided to the enabled first speech recognition engine (108) or the second speech recognition engine (110), thereupon allowing for the reduction in power consumption by disabling a speech recognition engine (108 or 110) until actively selected by the speech recognition engine selector (106).

22 Claims, 5 Drawing Sheets

METHOD AND APPARATUS FOR SELECTIVE SPEECH RECOGNITION

BACKGROUND OF THE INVENTION

The invention relates generally to speech recognition, and more specifically, to the selection of one of multiple speech recognition engines based on a media type.

With the growth of speech recognition engine capabilities, there is a corresponding increase in the number of applications and uses for speech recognition. Different types of speech recognition applications and systems have been developed, based upon the location of the speech recognition engine with respect to the user. One such example is an embedded speech recognition engine, otherwise known as a local speech recognition engine, such as the SpeechToGo speech recognition engine, available from SpeechWorks International, Inc., 696 Atlantic Avenue, Boston, Mass. 02111. Another type of speech recognition engine is a network-based speech recognition engine, such as Speech-Works 6, as sold by SpeechWorks International, Inc., 695 Atlantic Avenue, Boston, Mass. 02111.

Embedded or local speech recognition engines provide the added benefit of speed in recognizing a speech input, wherein a speech input includes any type of audible or audio-based input. A drawback of embedded speech or local speech recognition engines is that these engines typically contain a limited vocabulary. Due to memory limitations and system processing requirements, in conjunction with power consumption limitations, embedded or local speech recognition engines provide recognition to only a fraction of the audio inputs recognizable by a network-based speech recognition engine.

Network-based speech recognition engines provide the added benefit of an increased vocabulary, based on the elimination of memory and processing restrictions. Although a downside is the added latency between when a user provides a speech input and when the speech input may be recognized, and provided back to the user for confirmation of recognition. In a typical speech recognition system, the user provides the audio input and the audio input is thereupon provided to a server across a communication path, whereupon it may then be recognized.

A problem arises when multiple speech recognition engines are available for recognizing the speech input. While each speech recognition engine provides advantages and disadvantages, it is more efficient to be able to select one of the particular speech recognition engines. There currently exists the availability to choose between multiple speech recognition engines using a variety of factors, such as a user-based selection. Another selection may be made by the recognition of a particular term, which thereupon indicates that a secondary type of specific entry may be inputted, such as if the initial speech input is the word "dial", a second speech recognition engine maybe selected based on having the availability to selectably recognize specific names or telephone book entries.

BRIEF DESCRIPTION OF THE DRAWINGS

The invention will be more readily understood with reference to the following drawings wherein.

DETAILED DESCRIPTION OF THE INVENTION

Briefly, a method and apparatus for selected speech recognition includes receiving a media file having media type indicator. A media file includes any type of file that contains or is a reference to content information that provides media output. The media file has a media type indicator, wherein the media type indicator is an indication of the media type of content information disposed within the media file, such as an indicator that the media file content information is audio information, video information, text information, or any other type of media output.

The method and apparatus further includes selecting a selected speech recognition engine in response to the media type indicator, wherein the selected speech recognition engine is either a first speech recognition engine or a second speech recognition engine. The method and apparatus further includes enabling the selected speech recognition engine to be capable of receiving at least one audio input. Audio input is typically provided by an end user through an audio input device, such as a microphone.

Figure 1:
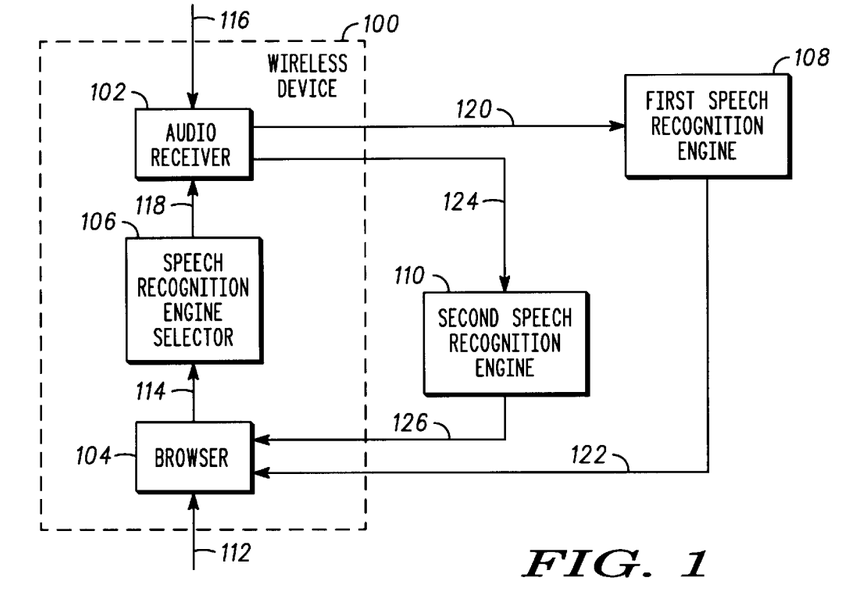
FIG. 1 illustrates one example of an apparatus for selecting a speech recognition engine.

FIG. 1 illustrates an electronic device 100 that has an audio receiver 102, a browser 104 and a speech recognition engine selector 106. The electronic device 100 includes, but is not limited to, a cellular phone, a laptop computer, a desktop computer, a personal digital assistant, a pager, a smart phone, or any other suitable device as recognized by one having ordinary skill in the art capable of executing the media file and providing either local or external speech recognition of audio input. The browser 104 may be implemented in hardware, software or a combination thereof, for allowing the downloading and viewing of content information. Furthermore, the speech recognition engine selector 106 may be also implemented in hardware, software or a combination thereof, for selecting a speech recognition engine.

In one embodiment, the audio receiver 102 is operably coupleable to a first speech recognition engine 108 and a second speech recognition engine 110. The browser 104 receives a media file 112, that has a media type indicator associated therewith. The browser 104 thereupon extracts the media type indicator 114 and provides it to the speech recognition engine selector 106.

The speech recognition engine selector 106, in response to the media type indicator, selects either the first speech recognition engine 108 or the second speech recognition engine 110 to receive and recognize a audio input 116. As such, the speech recognition engine selector 106 provides a selection signal 118 to the audio receiver 102, such that the audio receiver may provide the audio input 116 to the selected speech recognition engine, 108 or 110.

If the selection signal 118 indicates the first speech recognition engine 108, when the audio input 116 is provided to the audio receiver 102, an encoded audio signal 120 is provided to the first speech recognition engine 108. The first speech recognition engine 108 recognizes the encoded input 120, in accordance with known speech recognition techniques, and provides a first recognized term 122 to the browser 104. When the selection signal 118 indicates the second speech recognition engine 110, the audio receiver 102 provides an encoded audio input 124 to the second speech recognition engine 110. Whereupon, the second speech recognition engine 110 recognizes the encoded audio input 124 in accordance with known speech recognition techniques, and provides a second recognized term 126 to the browser 104.

Figure 2:
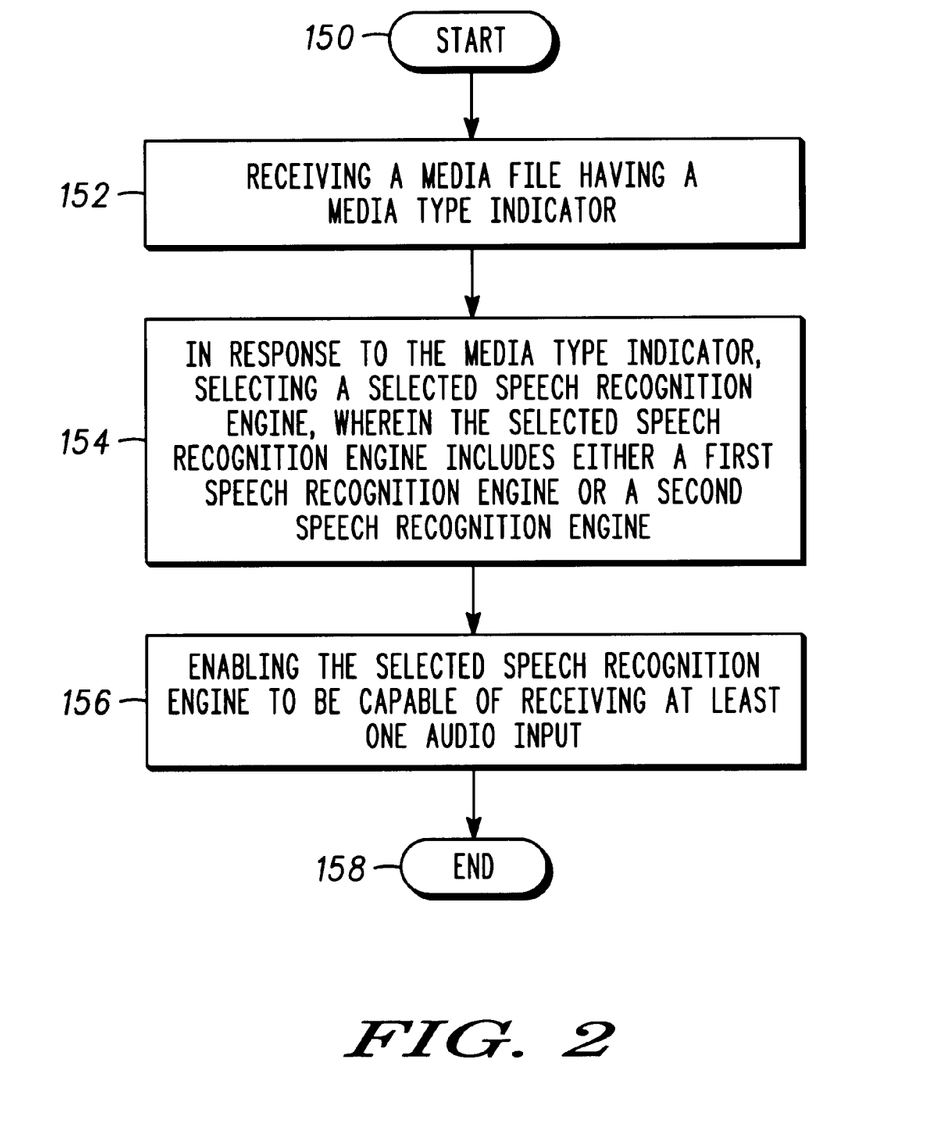
FIG. 2 illustrates example of a method for selecting a speech recognition engine.

FIG. 2 illustrates an example of the method for selecting a speech recognition engine. The method begins 150 by receiving a media file having a media type indicator, step 152. As discussed above, a media file maybe any type of file having media content information or a pointer to content information, such as marked-up language file, a universal resource indicator (URI), an audio file, a video file, or any other type of single or multi-media based content information.

The next step, step 154, includes selecting a selected speech recognition engine in response to a media type indicator, wherein the selected speech recognition engine includes either first speech recognition or a second speech recognition engine. As discussed above, the first speech recognition engine 108 maybe an embedded speech recognition engine disposed within the electronic device 100 and the second speech recognition engine 110 maybe an external speech recognition engine disposed external to the electronic device, such as on a content server. Furthermore, as discussed above, in another embodiment the first and second speech recognition engines 108, 110, may be both disposed on a communication server or within the electronic device or across a plurality of electronic devices or communication servers.

Thereupon, the method includes enabling the selected speech recognition engine to be capable of receiving at least one audio input, step 156. This step includes providing an initialization command or an activation command and establishing a direct link such that all direct speech inputs are provided to the selected speech recognition engine. Thereupon, the method is complete step 158.

Figure 3:
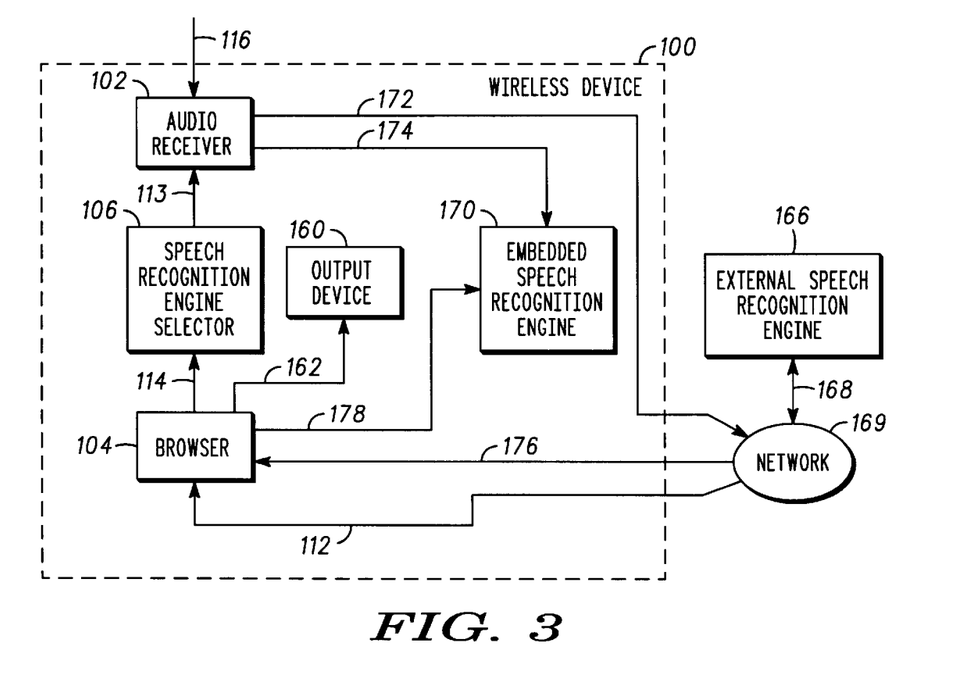
FIG. 3 illustrates another example of the apparatus for selecting a speech recognition engine.

FIG. 3 illustrates another example of apparatus for the selected selection of a speech recognition engine. FIG. 3 illustrates the electronic device 100 having the audio receiver 102 and the browser 104 with the speech recognition selector 106 disposed therein. The electronic device also includes an output device 160 operably coupled to the browser 104 such that the browser 104 provides an output 102 of a media file 112. For example, an output device may be a display for providing visual output or text output or may be a speaker for providing an audio output, or any other type of output device as recognized by one having ordinary skill in the art. The electronic device 100 includes the ability to communicate with a network 164, such as a standard communication network, a cellular or other wireless area network or wireless local area network. The network 164 is in communication with an external speech recognition engine 162 via communications path 168, which maybe a wired or wireless communication path. As recognized by one having ordinary skill in the art, the external speech recognition engine 166 may be disposed on a communication network server and may be accessible through one or more proxy servers (not shown) for routing the audio input, such as 116, for speech recognition.

Electronic device 100 further includes an embedded speech recognition engine 170 which is operably coupled to the audio receiver 102 and the audio receiver 102 is coupleable to the external speech-recognition engine 166 through the network 164. Similar to the embodiment described above, with respect to FIG. 1, the speech recognition engine selector 106 provides the selection signal 118 to the audio receiver 102. The audio receiver 102 upon receiving an audio input 116, provides an encoded audio input 172 or 174 to either the external speech recognition engine 166 or the embedded speech recognition engine 170, respectively.

In one embodiment, the audio receiver 102, prior to receiving an audio input 116, but based upon receiving the selection signal 118, may activate one of the specific speech recognition engines, 166 or 170. For example, during normal operations to conserve power, the embedded speech recognition engine 170 may be disabled, but when a media type indicator is received, such that the embedded speech recognition engine 170 may be utilized, the audio receiver 102 may send an acknowledgement or initialization signal to the embedded speech recognition engine 170. Therefore, while the browser 104 is providing for the output of the content information 162 to the output device 160, any audio input 116 may be directly provided to the embedded speech recognition engine 170, as this speech recognition engine has been selectively activated and, engaged or turned-on, in response to the media type of the media file 112 received by the browser.

In one embodiment, the media file 112 may be received from the network 164. The media file may be any type of media file capable of being received and executed by the browser 104, and thereupon provided to the output device 160. Furthermore, FIG. 3 illustrates that upon receiving an encoded audio input 172, the network 164 provides the input to the external speech recognition engine 166 via communication path 168. The external speech recognition engine 166 recognizes the input in accordance with known speech recognition techniques and provides the recognized term back to the browser 104, providing recognized term 176 from the network 164 to the browser 104. Furthermore, if the embedded speech recognition engine 170 is activated and the audio receiver 102 provides the encoded audio input 174 thereto, the embedded speech recognition engine 170 recognizes the term in accordance with known speech recognition techniques and provides the recognized term 178 to the browser 104.

Thereupon, in accordance with one embodiment, the browser 104 receives the recognized term, 176 or 178, and thereupon executes a command in response to the recognized term. For example, if the media file 112 includes video content and the browser 104 provides the video content 162 to the output device 160, an end user may provide an audio input 116 instructing the browser 104 to pause the display. In this example, the audio receiver 102 receives the audio input 116 and provides the input to either the external speech recognition engine 166 or the embedded speech recognition engine 170, based upon the selection signal 118. In the event the selection signal 118 indicates the activation of the embedded speech recognition engine 170, encoded audio input 174 is provided thereto, such that the command pause is recognized and provided to the browser 104. Whereupon, the browser may pause the display of the content information 162 and the output device 160.

Figure 4:
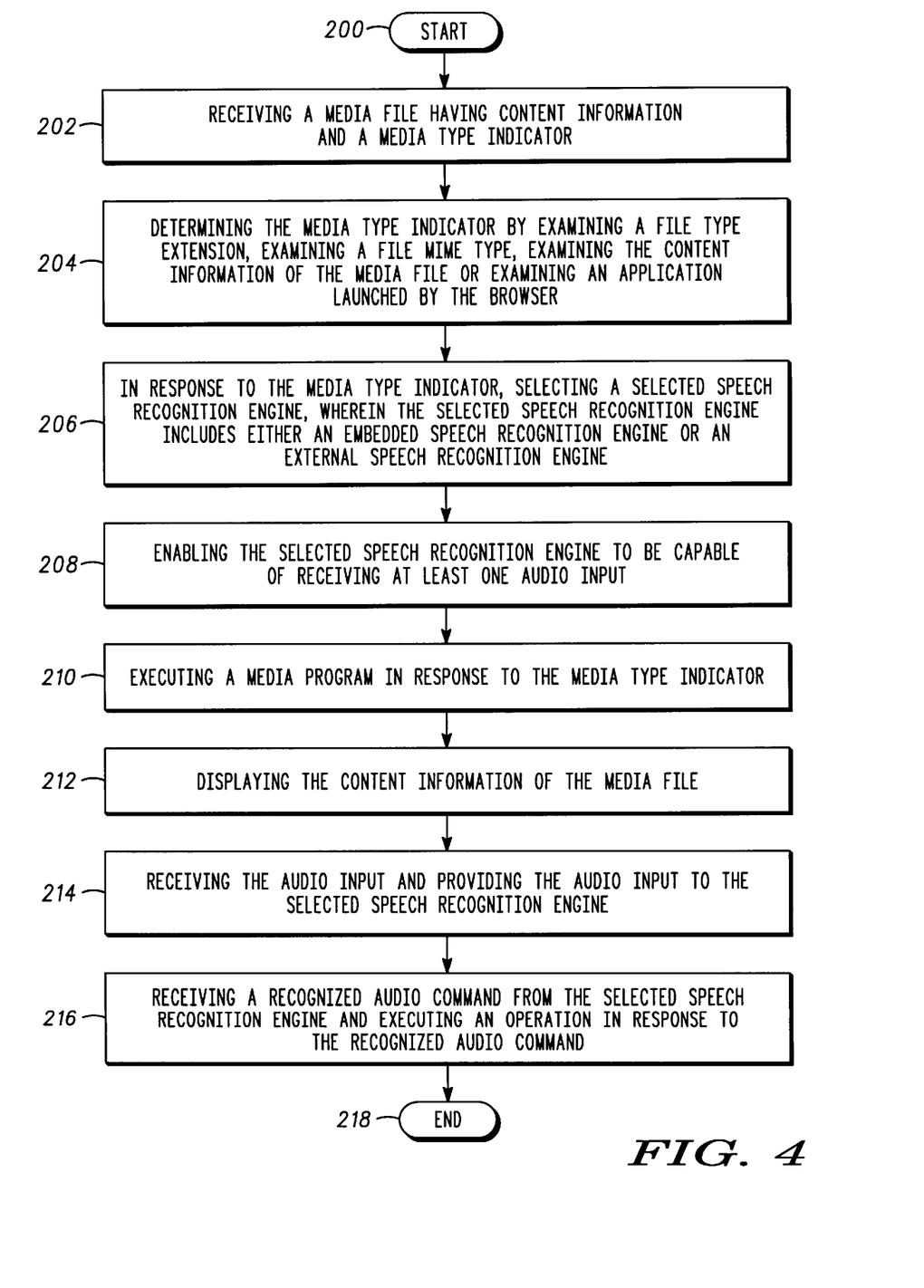
FIG. 4 illustrates another example of a method forselecting a speech recognition engine.

FIG. 4 illustrates another example of a method for the selected selection of speech recognition based on a media file type. The method begins 200 by receiving a media file having content information in the media type indicator, step 102. The next step includes determining the media type indicator, the step may be accomplished by examining a file type extension, such as a .HTM, .XML, or by examining a file MIME type, examining the content information of the media file itself, or detecting an application launched by the browsers in response to the media file, step 102.

Thereupon, in response to the media type indicator, the method includes selecting a speech recognition engine, wherein, the selected speech recognition engine is either an embedded speech recognition engine or an external speech recognition engine step 206. In one embodiment, the step of selecting further includes comparing the media type indicator with a recognition capability signal for each of the speech recognition engines, wherein a recognition capability signal includes any signal capable of providing an indication of the speech recognition capability for the associated speech recognition engine. For example, an embedded speech recognition engine typically has a lower speech recognition capability, and the external speech recognition engine typically has a higher speech recognition capability. The recognition complexity level corresponds to how many words or phrases the speech recognition engine can handle using the available resources. The recognition complexity increases as the recognizable language set increase. Usually the recognizable phrases are represented for the speech recognition engine needs as a finite state network of nodes and arcs. The recognition complexity level would be, for example, that the recognition is limited to such networks of 50 nodes. As recognized by one having ordinary skill in the art, there exists other implementations and variations of the recognition complexity levels. The next step 208 includes enabling the selected speech recognition engine so as to be capable of receiving at least one audio input.

Within the browser, the next step is executing a media program in response to the media type indicator, step 210. For example, the browser may launch an audio player to execute a audio file or may launch a video player to execute a video file. The next step includes displaying the content information of the media file, step 212.

At this point, the electronic device may receive an audio input and thereupon provide the audio input to the selected speech recognition engine, step 214. As discussed above, for exemplary purposes, if the media file was a video file, the audio input maybe a command directed to the instructions for viewing the video file, such as START, STOP, PAUSE.

The next step, step 216, includes receiving a recognized audio command from the selected speech recognition engine and executing an operation in response to the recognized audio command. For example, if a video file is being displayed and a user enters the voice input of "PAUSE," the selected speech recognition engine recognizes the speech input and provides the recognized term to the browser, wherein the browser thereupon pauses the display of the video file. Thereupon, the method is complete, step 218.

Figure 5:
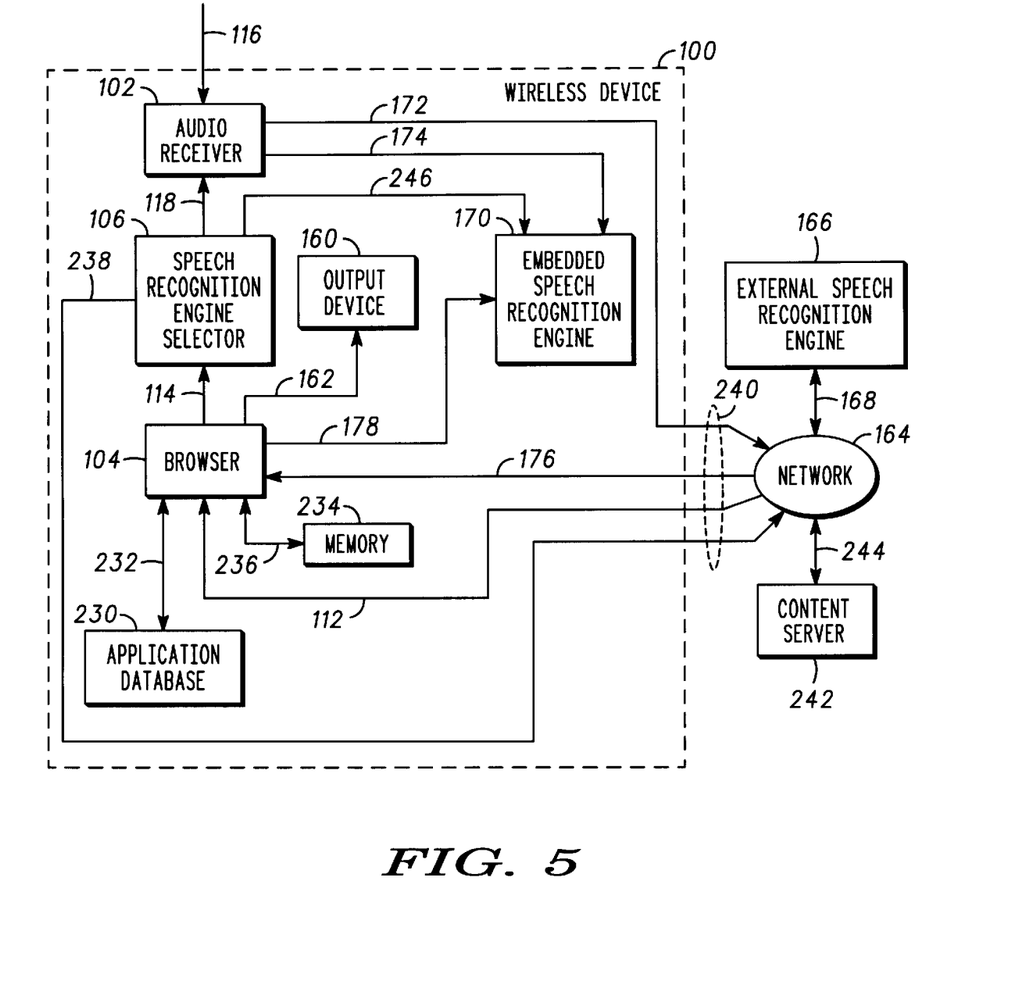
FIG. 5 illustrates another example of an apparatus for selecting a speech recognition engine.

FIG. 5 illustrates another example of the electronic device 100 capable of selecting speech recognition based on immediate type. The electronic device includes the audio receiver 102, the browser 104 and the speech recognition engine selector 106. The electronic device 100 further includes the output device 160, the embedded speech recognition engine 170 and an application database 172. The application database 230 includes a database of executable applications 232, which may be retrieved from or provided to the browser 104, in response to a request for the application 230. For example, if the browser 104 requests the use of an audio player, the audio player may be disposed within the application database 230 and provided to the browser 104, such that the browser may play an audio file. The browser 104 is further operably coupled to a memory 234 for providing a media file 236 from memory to the browser 104. The memory 234 and database 230 may be, but not limited to, a single memory, plurality of memory locations, shared memory, CD, DVD, ROM, RAM, EEPROM, optical storage or any other nonvolatile storage capable of storing digital data for use by the browser 104.

Similar to the electronic device 100 of FIG. 3, the electronic device 100 is coupleable to the network 164 and thereupon in communication with the external speech recognition engine 166, via communication path 168. FIG. 5 illustrates the audio receiver providing encoded audio input 172 to the network 164, the network providing a recognized term 176 to the browser 104, the network providing the media file 112 to the browser 104 and further receiving an engagement signal 238 from the speech recognition engine selector 118. As recognized by one having ordinary skill in the art, the signals may be transmitted across a common communication path 240, such as provided from a central transmitter/receiver (not shown), but have been illustrated as separate and distinct signals for illustrations and clarity purposes only.

In one embodiment, a content server 242, such as a communication or other Internet-based server, may provide a content media file 244 to the network 164 which thereupon provides the media file 112 to the browser 104. In response thereto, the browser 104 extracts the media file type indicator 114 therefrom. In one embodiment, the media file type indicator may be determined by looking at an extension on the file, such as .HTM, .XML, by looking at a MIME-type, examining the contents of the media file itself, or determining which application 232 is provided from the application database 230.

As discussed above, the speech recognition engine selector 106 receives the media file type indicator 114 and thereupon selects which speech recognition engine is to be utilized. In one embodiment, a selection signal 118 is provided to the audio receiver 102 such that the audio receiver may actively engage, turn-on, or select for routing, the selected speech recognition engine, 166 or 170. In another embodiment, the speech recognition engine selector 106 may send the selection signal 118 which includes routing information to the audio receiver 102 to provide the audio input 116 to the selected engine, but the speech recognition engine selector 106 may further generate an enablement signal to enable/activate, the selected speech recognition engine. In the event the embedded speech recognition engine 170 is selected, the speech recognition engine selector 106 generates an embedded speech recognition engine activation signal 246 and in the event the external speech recognition engine 166 is selected, the speech recognition engine selector 106 generates the external speech recognition engine enablement signal 238, which is provided via the network 164. Therefore, in the system illustrated in FIG. 5, the embedded speech recognition engine 170 and/or the external speech recognition engine 166 may be actively disabled until provided with an enablement signal, such as 246 or 238, to conserve power and reduce power consumption.

Furthermore, in another embodiment, the speech recognition engine selector 106 may provide an enablement signal to the selected speech recognition engine, being either the embedded speech recognition engine 170 or the external speech recognition engine 166, and further provide an ignore list, to the non-selected speech recognition engine, which constitutes either the external speech recognition engine 166 if the embedded speech recognition engine 170 is selected and the embedded speech recognition engine 170 if the external speech recognition engine 166 is selected. Therefore, in this embodiment, the audio receiver 102 may provide the audio input 116 to both speech recognition engines, wherein when a recognized term from a recognized list is recognized by the non-selected speech recognition engine, the non-selected speech recognition engine does not provide the recognized term back to the browser 104. In this embodiment, this provides for an interrupt sequence, wherein a user may override the selected speech inputs requested by the electronic device 100. For example, if a user is viewing a video file on the output device 160, and decides to call another user, the user may override the browser 104 playing the video, by speaking the command DIAL, wherein the non-selected speech recognition engine will recognize the command and execute a separate command to allow the electronic device 100 to call a particular party, instead of requiring the end user to provide the audio input 116 of STOP and further exiting the video player application to provide for dialing a third party.

Figure 6:
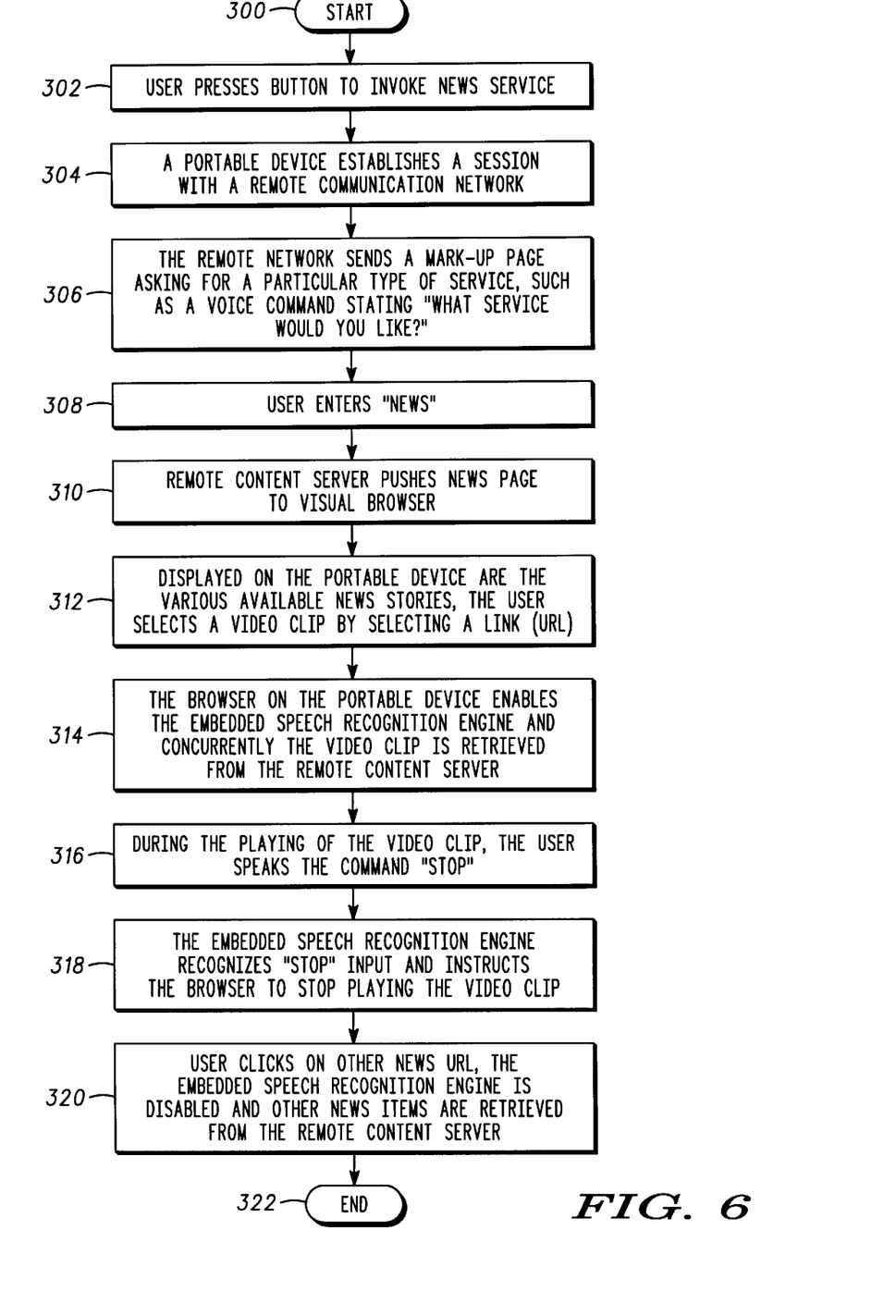
FIG. 6 illustrates one example of an embodiment utilizing the method for selecting a speech recognition engine.

FIG. 6 illustrates a flow chart of the steps of one example of an embodiment of a method for selected selection of a speech recognition engine based on a media type. The process begins 300 by a user pressing a button on an electronic device to invoke a new service, step 302. For example, a user may scroll through a menu of available services on an electronic device and further select a particular website or service provider. The next step is that the electronic device establishes a communication session with a remote communication network, step 304. The establishment of the communication session is in accordance with established communication techniques.

The remote network sends a marked-up page asking for a particular type of service, for example providing a voiceXML command stating "What service would you like?", step 306. Thereupon, the user may provide the audio input "News", step 308. The remote content server pushes the news page to a visual browser, step 310, which may be disposed upon the electronic device.

The electronic device displays a menu illustrating that there are various available news story and allowing the user to select a video clip by selecting a link or a URL, step 312. Thereupon, the browser on the electronic device enables the embedded speech recognition engine and concurrently the video clip is retrieved from the remote content server, step 314. The next step, step 316 allows for the display of the video clip and, during the playing of the video clip, the user speaks the command "STOP," step 316.

In response to the command "STOP", the embedded speech recognition recognizes the input and instructs the browser to stop playing the video clip, step 318. Furthermore within this example, the user may then click upon any other of the listed news URLs. The embedded speech recognition engine is disabled and other news items are retrieved from the remote content server, step 320. Thereupon, the method is complete 322, wherein within the electronic device, the embedded speech recognition engine is disabled until specific context based information dictates the activation of the embedded speech recognition engine for recognizing associated relative terms associated with the browser media display.

It should be understood that there exists implementations of other variations and modifications of the invention and its various aspects, as may be readily apparent to those of ordinary skill in the art, and that the invention is not limited by the specific embodiments described herein. For example, the speech recognition engine selector 106 may be operably coupleable to any number of speech recognition engines disposed within the electronic device or external to the electronic device and in communication via the network 164 or through any other combination of servers or proxies such that each specific speech recognition engine may provide an individual or beneficial speech recognition capabilities with respect to the media displayed by the browser 104 through the output device 160. Also, the media file may be a streaming media file or have multiple media type indicators. It is therefore contemplated and covered by the present invention, any and all modifications, variations, or equivalents that fall within the spirit and scope of the basic underlying principles disclosed and claimed herein.

What is claimed is:

1. A method for selective speech recognition comprising:
   receiving a media file having a media type indicator;
   in response to the media type indicator, selecting a selected speech recognition engine, wherein the selected speech recognition engine includes at least one of: a first speech recognition engine and a second speech recognition engine; and
   enabling the selected speech recognition engine to be capable of receiving at least one audio input.

2. The method of claim 1, wherein the media file includes content information, the method further comprising:
   executing a media program in response to the media type indicator; and
   displaying the content information of the media file.

3. The method of claim 1 further comprising:
   receiving the at least one audio input; and
   providing the at least one audio input to the selected speech recognition engine.

4. The method of claim 3 further comprising:
   receiving a recognized audio input from the selected speech recognition engine; and
   executing an operation in response to the recognized audio input.

5. The method of claim 1 wherein the step of selecting further comprises:
   comparing the media type indicator with a recognition capability indicator for each of: the first speech recognition engine and the second speech recognition engine.

6. The method of claim 1 wherein the first speech recognition engine is an embedded speech recognition engine and the second speech recognition engine is an external speech recognition engine.

7. The method of claim 1, wherein the step of enabling further includes disabling a non-selected speech recognition, wherein the non-selected speech recognition engine is the one of: the first speech recognition engine and the second speech recognition engine that is not the selected speech recognition engine.

8. The method of claim 7 wherein the step of enabling at least one speech recognition engine further includes providing a list of ignore inputs to the non-selected speech recognition engine.

9. An electronic device comprising:
   an audio receiver capable of receiving an audio input;
   a browser capable of receiving a media file having a media type indicator, the browser operably coupled to the audio receiver and operably coupleable to a first speech recognition engine and a second speech recognition engine; and a speech recognition engine selector such that the speech recognition selector selects a selected speech recognition engine based on the media type indicator, wherein the selected speech recognition engine includes at least one of: the first speech recognition engine and the second speech recognition engine, wherein when an audio input is received, the audio input is provided to the selected speech recognition engine.

10. The electronic device of claim 9 further comprising:
an output device capable of receiving an output signal from the browser, wherein the output signal represent content information disposed within the media file.

11. The electronic device of claim 9 wherein the first speech recognition engine is an embedded speech recognition engine and the second speech recognition engine is an external speech recognition engine.

12. The electronic device of claim 9 wherein the audio receiver receives the audio input and the audio input is provided to the selected speech recognition engine such that the speech recognition engine may recognize the audio input and provide a recognized input to the browser, wherein the browser executes an operation in response to the recognized input.

13. A method for selective speech recognition comprising:
receiving a media file having a media type indicator;
determining the media type indicator;
selecting a selected speech recognition engine in response to the media type indicator, wherein the selected speech recognition engine includes at least one of: a first speech recognition engine and a second speech recognition engine; and
enabling the selected speech recognition engine to be capable of receiving at least one audio input.

14. The method of claim 13, wherein the media file includes content information, the method further comprising:
executing a media program in response to the media type indicator;
displaying the content information of the media file;
receiving the at least one audio input; and
providing the at least one audio input to the selected speech recognition engine.

15. The method of claim 14 further comprising:
receiving a recognized audio input from the selected speech recognition engine; and
executing an operation in response to the recognized audio input.

16. The method of claim 13 wherein the step of selecting further comprising:
comparing the media type indicator with a recognition capability indicator for each of the first speech recognition engine and the second speech recognition engine.

17. The method of claim 13 wherein the first speech recognition engine is an embedded speech recognition engine and the second speech recognition engine is an external speech recognition engine.

18. The method of claim 13 wherein the media file includes content information, the step of determining the media type indicator includes at least one of the following: examining a file type extension, examining a file mime type, examining the content information of the media file and examining an application launched by the browser.

19. An apparatus for selective speech recognition comprising:
an audio receiver capable of receiving an audio input; and
a browser capable of executing executable instructions, wherein the browser, in response to the executable instructions:
receives a media file having a media type indicator;
determines the media type indicator;
selects a selected speech recognition engine in response to the media type indicator, wherein the selected speech recognition engine includes at least one of: a first speech recognition engine and a second speech recognition engine; and
enables the selected speech recognition engine to be capable of receiving at least one audio input;
executes a media program in response to the media type indicator;
displays the content information of the media file;
receives the at least one audio input; and
provides the at least one audio input to the selected speech recognition engine.

20. The apparatus of claim 19 wherein the browser receives a recognized audio input from the selected speech recognition engine and executes an operation in response to the recognized audio input.

21. The apparatus of claim 19 wherein the first speech recognition in an embedded speech recognition engine disposed within the apparatus and the second speech recognition is an external speech recognition engine.

22. The apparatus of claim 21 wherein the browser, the audio receiver and the embedded speech recognition engine are disposed within an electronic device.

* * * * *